United States Patent [19]

Sanford et al.

[11] 4,378,103
[45] Mar. 29, 1983

[54] ELECTRICAL CONTACT RETENTION INSERT AND MEANS FOR MOLDING SAME

[75] Inventors: Richard Sanford, Maryland; Normand C. Bourdon, Unadilla, both of N.Y.

[73] Assignee: The Bendix Corporation, Southfield, Mich.

[21] Appl. No.: 356,655

[22] Filed: Mar. 10, 1982

Related U.S. Application Data

[62] Division of Ser. No. 92,132, Nov. 7, 1979, abandoned.

[51] Int. Cl.³ .......................... B29C 1/00; B29C 6/00
[52] U.S. Cl. .................................. 249/184; 249/145; 425/DIG. 34
[58] Field of Search ............... 425/DIG. 34; 249/145, 249/184, 186

[56] References Cited

U.S. PATENT DOCUMENTS

| | | | |
|---|---|---|---|
| 2,781,548 | 2/1957 | Morin | 249/186 |
| 2,818,618 | 1/1958 | Winship et al. | 249/186 |
| 2,870,515 | 1/1959 | Parfitt | 249/184 X |
| 2,890,490 | 6/1959 | Morin | 249/184 X |
| 3,387,323 | 6/1968 | Wyllie et al. | 249/184 X |
| 4,157,806 | 6/1979 | Bourdon et al. | 249/184 |

Primary Examiner—J. Howard Flint, Jr.
Attorney, Agent, or Firm—William G. Kratz, Jr.; Raymond J. Eifler; Charles D. Lacina

[57] ABSTRACT

A dielectric insert 10 for securing a plurality of electrical connector retention clips 29. The insert 10 includes passages 15 having therein retention clip shoulder housings 17 and an abutment 21 which define a cavity 23 within which a retention clip 29 can be removably mounted. The insert 10 is an integral body molded of a dielectric material. A means for molding the insert 10 through the use of a core pin 53 and a bushing 61 is also disclosed. This insert 10 and the means for molding it are adapted to either the pin contact 33 or the socket contact 43 used in electrical connectors 77 and 77'.

3 Claims, 10 Drawing Figures

ELECTRICAL CONTACT RETENTION INSERT AND MEANS FOR MOLDING SAME

This is a division, of application Ser. No. 92,132, filed Nov. 7, 1979 and now abandoned.

BACKGROUND OF THE INVENTION

This invention relates to electrical connectors of the type having insertable and removable contacts. The invention is more particularly related to a means for the securing of an electrical contact retention device within an integral body of dielectric material. Additionally, a means for molding the integral dielectric insert with a core pin and core bushing is disclosed.

Electrical connectors generally include a plug and a receptacle, each of which has an insert of dielectric material within which electrical contacts are retained. The prior art under consideration addresses the insert means which were employed to secure electrical contact retention devices within a dielectric material and the means of molding these inserts.

Among the techniques often employed was the use of complex and intricate retaining mechanisms which were generally comprised of multiple pieces of dielectric material bonded together. When multiple pieces of dielectric are used, it is necessary to carefully seal the pieces together in order to eliminate the lower resistance paths and electrical breakdowns which occur between contacts along the interface of the pieces that form the retention clip insert. Examples of this method are disclosed in U.S. Pat. No. 3,727,172 and No. 3,638,165. The difficulties encountered with multiple pieces of dielectric bonded together to form an insert were partially overcome by minimizing the number of pieces of dielectric material required to fabricate an electrical connector insert. This technique is advanced in U.S. Pat. No. 4,082,398, assigned to the assignee of the present invention and incorporated by reference herein. Perhaps one of the most significant developments prior to this disclosure in the field of electrical connector retention means is found in U.S. Pat. No. 3,158,424. Among the teachings of this patent is the use of a flange, encompassing a full 360°, at the rearward edge of an insert passageway that is designed to hold an electrical connector retention clip within the bored section of an insert. This design, however, contains several drawbacks which become evident in the manufacture of the insert. It is taught that this insert can be molded with an annular member that is removable or dissolvable or otherwise disposable from the molded insert. Among the problems encountered in this method of manufacture is an inexactness in the length and positioning of the metal bushing being molded into the insert. After melting the bushing away from the insert, a standard length connector retention clip may not seat properly with the result that the entire insert must be scrapped. Another problem with this type of manufacturing method is that the metal bushings have to be cleaned thoroughly prior to molding the bushing into the insert. If any metal chips have not been cleaned from the bushings, they become molded into the insert and can cause electrical breakdowns within the insert. Another major problem with the use of metal bushings is that oxidation and static electricity are formed on the bushings. This results in obvious handling and molding difficulties.

The present invention eliminates the problems encountered with electrical failures within the inserts as well as those difficulties common to the manufacturing methods now employed.

SUMMARY OF THE INVENTION

An electrical connector insert 10 which is integrally molded from a dielectric material comprises a plurality of passages 15 which extend therethrough from a rear face 13 to a front face 11, a retention clip shoulder housing 17 near the rear face 13, and a rearwardly facing sleeve abutment 21 which reduces the bore of the passage 15. The shoulder housing 17 and sleeve abutment 21 form the rear and frontal boundries of the retention clip cavity 23. The passage 15 allows the close passing and securing of a contact retention clip 29 between the forward facing vertical edge 19 of the shoulder housing 17 and the rearward facing wall of the abutment 21.

The contact retention clip 29 has at least two fingers 31 which, when mounted within the insert passage 15, are positioned forwardly and radially inward to form a resilient cone. When an electrical connector pin 33 with an elongated body having, as an integral part of its structure, an enlarged section 37 is entered into the passage 15 through the rear face 13, and through retention clip 29, the connector pin 33 causes these fingers 31 to be forced away from their rest position back against the walls of the passage 15. Once the enlarged section 37 is clear of the fingers 31, the forward wall 39 of the enlarged section 37 is contiguous with the sleeve abutment 21 and the fingers 31 will return to their rest position against the rear wall 41 of the enlarged section 37. Thus, the connector pin 33 is removably secured between the sleeve abutment 21 and the retention clip fingers 31.

The passage 15 of insert 10 can be integrally molded, to incorporate all the features for the mounting of a retention clip 29 and connector pin 33 described above, by means of the herein disclosed core pin 53 and core bushing 61 configuration. The core pin 53 and core bushing 61 are matable and, when mated, produce an insert passage 15 mold which renders a shoulder housing 17, contact clip cavity 23, abutment 21, contact sleeve 25 and openings 27. Once the material used to mold the insert 10 is set, the core pin 53 can be withdrawn from the rear face 13 of passage 15 and the core bushing can be withdrawn through the contact sleeve 25 and the openings 27. No further tooling of the insert 10 is required. These means for molding the insert 10 can be mounted in different numbers and patterns to suit the type of connector shell 81 within which an insert 10 will be mounted.

It is an object of this invention to provide a means for securing the contact retention clips of an electrical connector insert by the use of an integral body.

It is another object of this invention to provide a simple and economical insert for an electrical connector.

It is still another object of this invention to provide a clip retention mounting insert which permits the removal of an electrical contact from the retention clip while retaining the retention clip within the insert.

It is still another object of this invention to minimize the number of pieces required to fabricate an electrical connector insert.

It is yet another object of this invention to provide a molding means which is immediately reusable and requires no tooling between uses.

It is an additional object of this invention to provide a molding means which manufactures an integrally molded dielectric insert that requires no tooling after the removal from the molding means.

DETAILED DESCRIPTION

Figure 1:
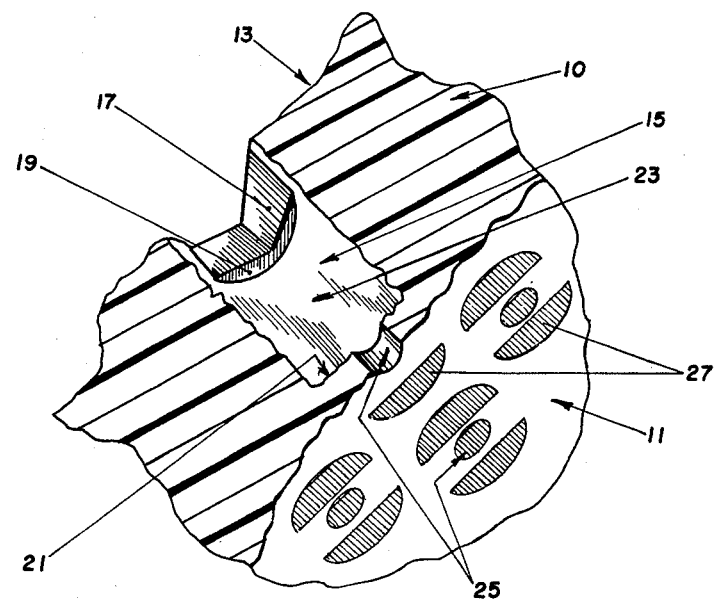
FIG. 1 is a partial cross-sectional diagrammatic view of an integrally molded dielectric insert designed to removably secure a contact retention clip and a pin contact assembly.

Referring now to the drawings, FIG. 1 illustrates a portion of an electrical connector insert that discloses one embodiment of the invention. The insert 10 consists of a body molded from a dielectric material. Generally, the dielectric insert is made from a thermoplastic resin, although other materials such as thermosetting materials may be used. Some examples of preferable materials are: polyester (Valox), polyarylsulfone (B 360 Astrel), polyethersulfone (Torlon), polymides (Nylon), acetates (Deldrin), and polycarbonates (Lexan). The polyester material sold under the trade name "Valox" is preferred along with polyarylsulfones and polyethersulfones. The foregoing materials have acceptable mechanical strength and electrical insulation characteristics which serve to increase the dielectric separation between adjacent contacts.

The insert 10 has a plurality pf passages 15 therethrough from a front face 11 to a rear face 13. The front face 11 being defined as that section of insert 10 which faces toward an engaged connector assembly, and the rear face 13 as that side of the insert 10 opposite front face 11. The insert 10 has along the rear face of passage 15 and extending forwardly and inwardly along the wall of passage 15 at least two retention clip shoulder housings 17. The shoulder housings 17 have a vertical inward edge 19 which faces an abutment 21. The section of passage 15 defined by the vertical inward edge 19 of shoulder housing 17 and sleeve abutment 21 forms a cavity 23 within which a retentin clip 29 is removably secured. The horizontal surface of shoulder housing 17 may be either flat, plate-like surfaces angled away from a central line as shown in the drawings or semicircular in shape. The vertical inward edge 19 of shoulder housing 17 can be angled rearwardly from the foregoing horizontal edge of the shoulder housing 17 to the wall of the passage 15. This configuration will provide a lip in the shoulder housing that will engage the rear edge of clip 29. The abutment 21 contains a contact sleeve 25 which completes the passage 15 within the integrally molded dielectric insert. Alternately, abutment 21, rather than presenting a surface perpendicular to the wall of passage 15, could be angled forward from the contact sleeve 25 to the wall of passage 15. This would provide a recessed lip that engages the forward edge of the retention clip.

Also shown in FIG. 1 are a plurality of openings 27 which are created during the molding process herein disclosed. These openings 27 provide a means through which the visual inspection of the forward seating and alignment of contact retention clips 29 is possible.

The shoulder housings 17 do not form a complete 360° lip at the rear face 13 of insert 10. Rather, due to the 17 are in axial alignment with openings 27 and form a partial lip along the rear face 13 of insert 10. An additional benefit of this design is the capability of examining the insert vertical edge 19 of shoulder housing 17 through the openings 27.

Figure 2:
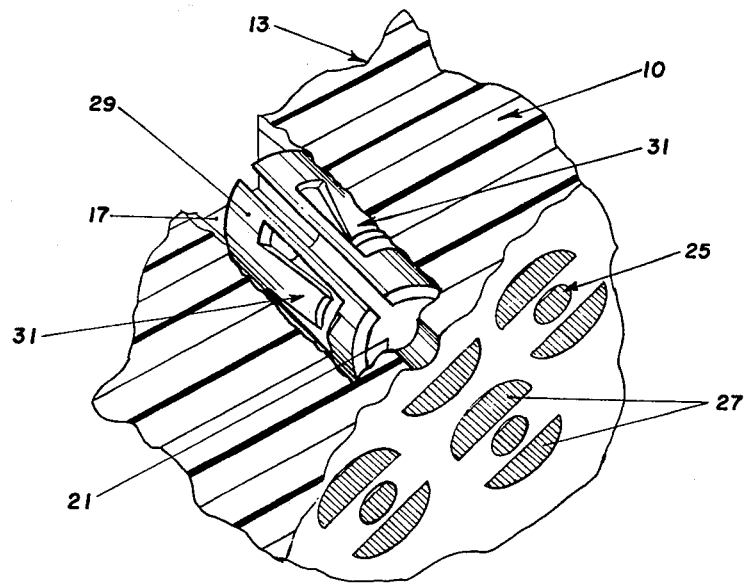
FIG. 2 is a partial cross-sectional diagrammatic view of the molded insert of FIG. 1 with a contact retention clip seated in the assembled position.

FIG. 2, another partial view of the electrical connector insert 10, shows a contact retention clip 29 installed within the cavity 23 section of the passage 15. It will be noted that clip 29 is not a completely enclosed cylinder, but rather has an opening along one full side. This opening permits a clip of resilient material to be slightly compressed in order to slide the clip between the shoulder housings 17 (only one shown in drawings) into the clip cavity 23. Once in place, the retainer clip 29 returns to its rest condition and is restricted in its lateral movement within the insert 10 by means of vertical edge 19 and the sleeve abutment 21. The fingers 31 of retention clip 29 are sections of the clip's 29 wall which point downwardly and forwardly forming a cone like configuration within the cavity 23.

Figure 3:
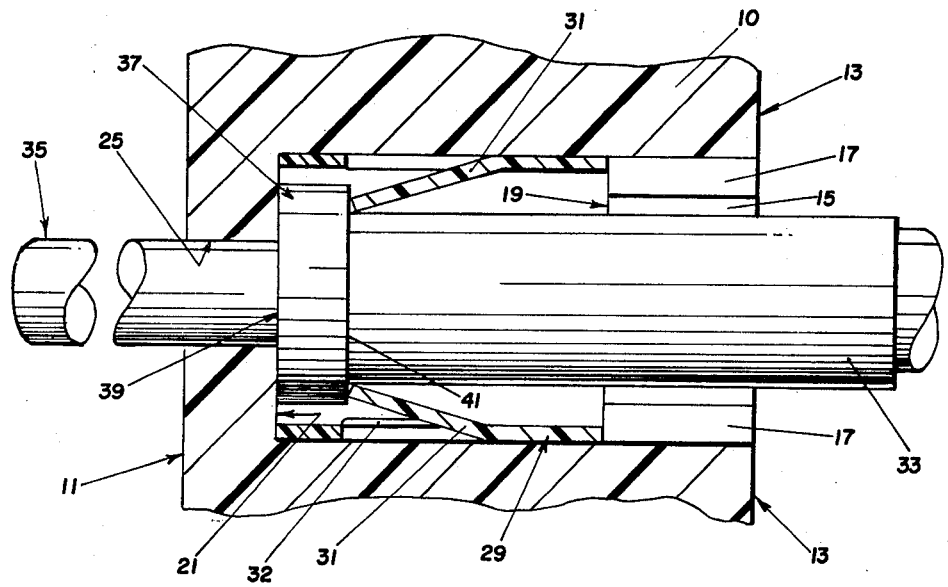
FIG. 3 is a cross-sectional view of an electrical pin contact engaged by a contact retention clip mounted within the molded insert.

In FIG. 3 the method by which a pin contact is removably secured within the body of insert 10 is illustrated. Additionally illustrated is a contact retention clip 29 mounted within the cavity 23 of passage 15, being restricted from rotational movement within the cavity 23 by means of the key 32 which extend axially along the wall of cavity 23 and engage the retention clip 29. More precisely, connector pin 33 enters through the rear face 13 of insert 10 and passes between the opposed shoulder housings 17. As connector pin 33 passes between the fingers 31 of retention clip 29, the enlarged section 37 pushes the fingers 31 out away from the center of the cavity, permitting the enlarged section 37 complete entry. When the forward wall 39 of enlarged section 37 is contiguous with the abutment 21, the fingers 31 will return to their rest position, engaging the rear wall 41 of the enlarged section 37. This will restrict lateral movement of the connector pin 33 within the insert 10. The terminal element 35 of connector pin 33 passes into and through the contact sleeve 25 in a close fitting relationship and extends beyond the front face 11 of insert 10 a sufficient distance to properly engage a socket contact. The shoulder housing 17 is in a spaced relationship to connector pin 33 and a tool can enter into the passage 15 therebetween. This tool will release connector pin 33 by forcing the fingers 31 away from their rest position, that is to say away from the rear wall 41 of enlarged section 37 and against the walls of clip 29. When this is accomplished, the connector pin 33 can be easily withdrawn from the insert 10.

Figure 4:
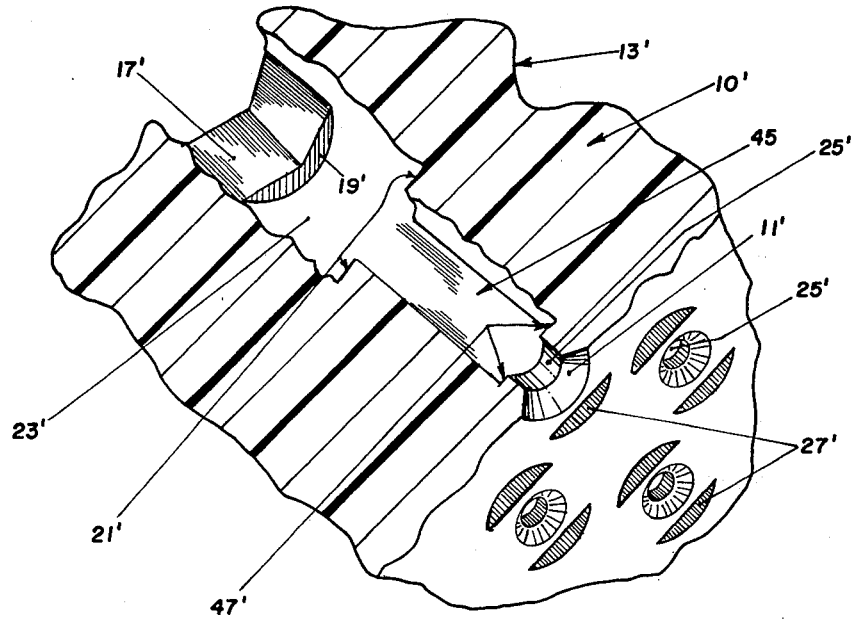
FIG. 4 is a partial cross-sectional diagrammatic view of an alternative embodiment of the invention which is molded to house an electrical socket contact.

FIG. 4 is an alternative embodiment of the insert 10' which is designed to receive and removably secure a socket contact 43. The principal difference lies in a socket bore 45 which rests between the front face of contact sleeve 25' and the abutment 21'. The contact retention clip 29' is removably mounted within the cavity 23' of insert 10' and restricted from lateral movement within the cavity 23' by abutment 21' and the vertical insert edge 19' of shoulder housing 17'. Whereas abutment 21' would be the same surface as the rearward face 47' of the contact sleeve 25' in the assembly employed for a contact pin 33, as displayed in FIGS. 1 through 3, the abutment 21' is now a separate entity. The rear face 47' of contact sleeve 25' can be sloped rearwardly from the walls of socket bore 45 to serve as a guide for a penetrating connector pin terminal element 35. A socket contact is removably secured by a retention clip 29' within the insert 10' with the same technique as depicted in FIG. 3. The insert 10' with a retention clip 29' and a connector socket 43 can be seen in this configuration in FIG. 10.

Figure 5:
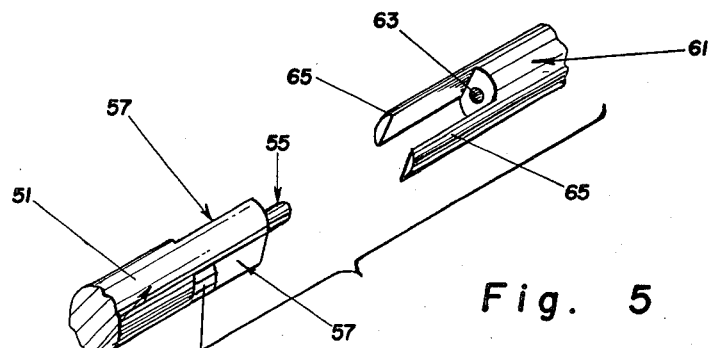
FIG. 5 is a schematic illustration of a separated core pin and bushing utilized in molding the clip retention insert used for a pin contact as in FIG. 1.
Figure 6:
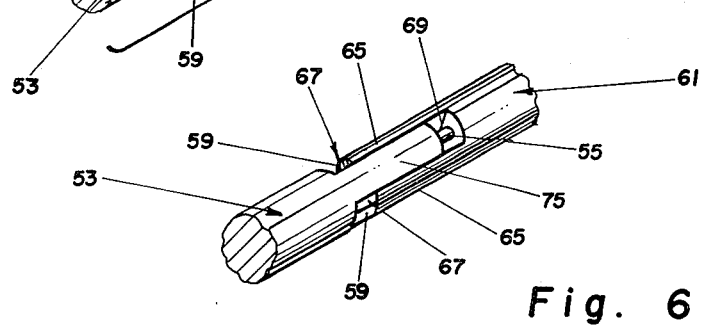
FIG. 6 is the mated view of the core and bushing of FIG. 5.

FIG. 5 illustrates a core pin 53 and a core bushing 61. The core pin 53 includes, at its forward edge, axial projection 55, at least two indented flat sides 57 and two shoulder forms 59 protruding from the rearward portion of two shoulder forms 59 protruding from the rearward portion of the flat sides 57 and contiguous with the rear base section 51 of core pin 53. Core bushing 61 includes an axial bore 63, which is matable with the axial projection 55 and side fins 65 which have flat internal walls and curved exterior walls and are matable with the flat sides 57 of the core pin 53. In the mated condition of FIG. 6, the rearwardly facing edges of the side fins 65 will abut the forward edge of shoulder forms 59. The combination of the side fins 65 with the flat sides 57 will form a shaft like section of the mold which forms the contact retention clip cavity 23 in insert 10. In this alignment there will be an open area 69 around the axial projection 55 which has only partially penetrated bore 63. This open area 69 forms the front face 11 and the abutment 21 of the passage 15. The axial projection 55 forms the contact sleeve 25 of insert 10. The shoulder forms 59 form a shoulder housing mold area 67. This corresponds to the shoulder housing 17. The rearward edges of side fins 65 control the angle, if any, of the shoulder housing's vertical inward edge 19. Those sections of the side fins 65 which are in a spaced relationship adjacent to axial projection 55 form the openings 27 seen in the inserts front face 11. Upon completion of the molding process the core pin 53 and core bushing 61 can be separated and withdrawn from the insert 10. Core pin 53 is drawn out through the rear face 13 of insert 10. Core bushing 61 is drawn from the front face 11 of insert 10 and leaves the opening 27.

Several modifications can be incorporated within the core pin 53 and core bushing 61 in order to fabricate an insert with features that will enhance the retention clip mounting and securing capabilities of the insert 10. For example, the vertical inward edge 19 of shoulding housing 17, if angled rearwardly towards the passage walls, would provide a lip like structure which would act to positively engage the contact retention clip 29. This result can be obtained by beveling the edges of the side fins 65 which abut shoulder form 59. The beveled section would extend above and behind the shoulder forms 59 when the core pin and bushing are mated. Another method of increasing the contact retention clip 29 mounting capability of insert 10 could be achieved by forming a groove in one of the sections of the core pin 53 or bushing 61 which form the clip retention cavity 23. This groove would extend along the length of the member on which it was cut, axially from a point corresponding with the forward edge of core pin 53 to a point corresponding with the forward edge of protrusions 59. This will leave a protruding key within the cavity 23 integral with insert 10 which would align with the contact retention clip 29 when assembled. Such a design would allow a fixed location of the retention clip fingers 31 relative to the enlarged section 37 of the pin contact 33. These features can similarly be incorporated in the core and pin bushings presented in FIGS. 7 and 8 which are employed in molding an insert 10' used with socket contact 43. These core pins 53 and core bushings 61 can be multiply mounted in an endless variety of configurations as dictated by the number of contacts required and the dimensions of the plug in which the inserts are mounted.

Figure 7:
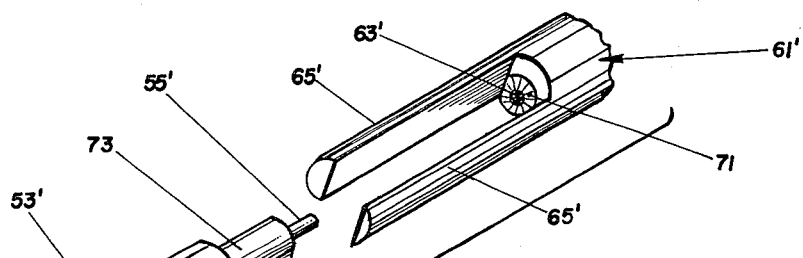
FIG. 7 is a schematic illustration of a separated core pin and bushing utilized in molding the clip retention insert used for a socket contact as in FIG. 4.
Figure 8:
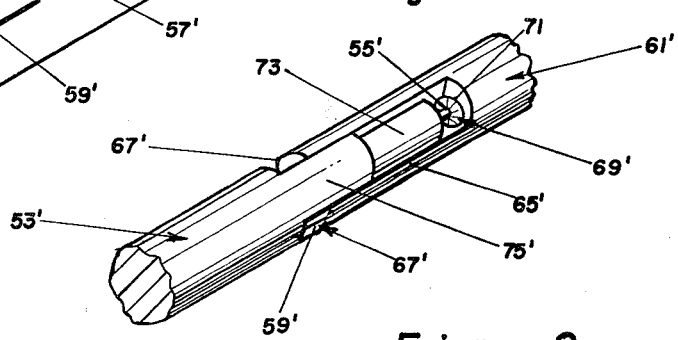
FIG. 8 is the mated view of the core and bushing of FIG. 7.

FIG. 7 illustrates a core pin 53' and a core bushing 61' which are utilized in the molding of an integral dielectric insert 10'. The core pin 53' includes a base portion 51' from which extends a shaft like portion which terminates in its forward end with axial projection 55'. At least two sides of the shaft like extensions are indented and flat 57'. In addition, a portion of this shaft has a reduced diameter which results in stepped sides 73. Also protruding from the flat sides 57' and in a contiguous relationship with the base 51' are shoulder forms 59'. The core bushing 61' includes at least two extending side fins 65' which are flat along their inside walls and curved along their outside walls, an axial bore 63' and a cone 71 which has its wide base in point having the axial bore 63'. The core pin 53' and core bushing 61' mate with the axial projection 55' penetrating the core 71 through axial bore 63'. Side fins 65' will abut the shoulder forms 59' and be aligned with and contiguous to the flat sides 57' of core pin 53'. This will provide a cavity 23' in the completed insert 10'. With this mated alignment there will be an open area 69' around the axial projection 55' which will form the front face 11' and the rearward face 47' of contact sleeve 25'. The axial projection 55' results in the contact sleeve 25'. The cone 71 creates a tapering extension with a cone-shaped mouth on the rearward face 47'. The cone shaped mouth can serve as a guide for the introduction of a pin contact terminal element 35. The steps 73 of core pin 51' form within the insert 10' a socket bore 45 which closely receives a socket contact. The vertical wall created by the different dimensions of step 73 and core pin 53' provides an abutment 21' within insert 10'. The section of the flat sides 57' contiguous with side fins 65' forms cavity 23' designed to receive a retention clip 29'. The protrusions 59', along with the portions of side fins 65' contiguous with the protrusions 59', form the shoulder housing 17' and vertical inward edge 19' of insert 10'. It should be noted that the modifications which can be introduced to core pin 53 and core bushing 61 are among the modifications which can be effected on core pin 53' and core bushing 61'.

Figure 9:
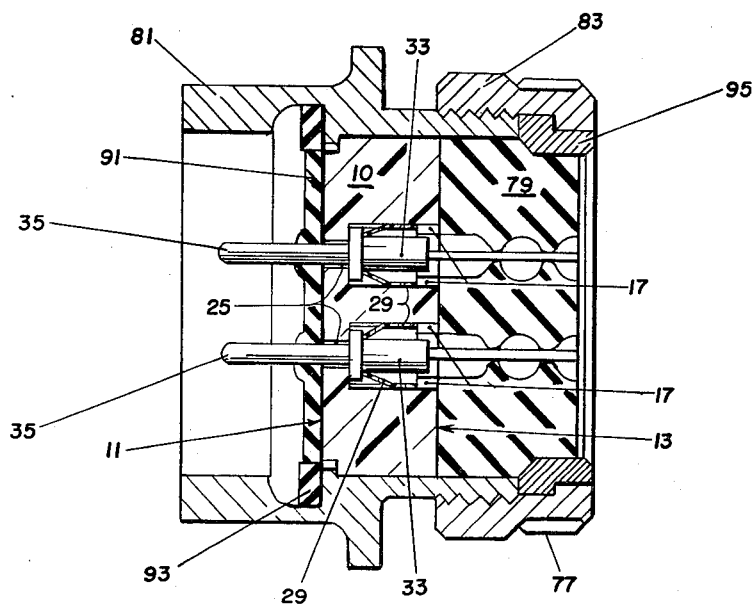
FIG. 9 is a molded dielectric insert, with retention clip and pin contact mounted, assembled in a typical electrical connector plug.

FIG. 9 illustrates an insert 10 that contains a plurality of connector pins 33 secured by retention clips 29. The insert 10 is mounted in a typical electrical connector plug assembly 77. Also shown are a rear moisture sealing grommet 79, an interfacial seal 91, a sealing gasket 93, a connector shell 81, a retaining nut 83 and a retaining ring 95.

Figure 10:
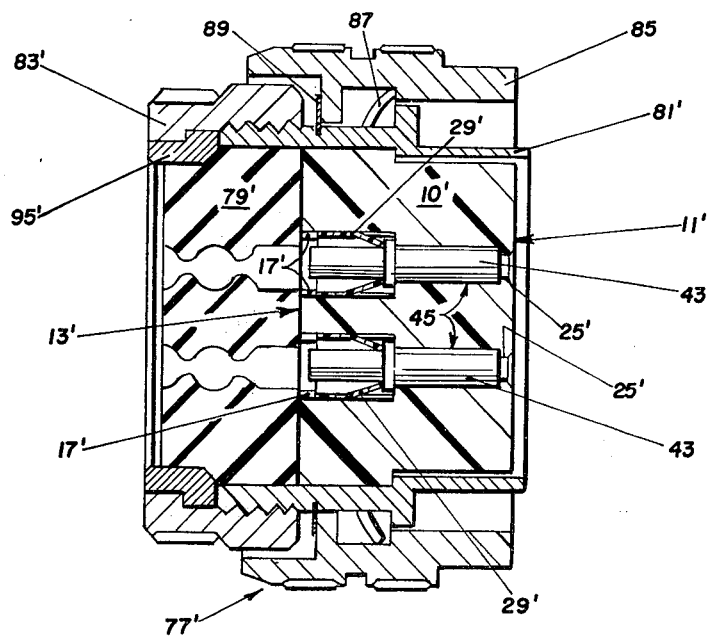
FIG. 10 is a molded dielectric insert with retention clip and socket contact mounted and assembled in a typical electrical connector plug such that the plugs in FIGS. 9 and 10 are matable.

FIG. 10 illustrates an integral dielectric insert 10' with connector socket 43 and contact retention clip 29' in a conventional socket assembly 77' which is matable with the conventional pin connector assembly of FIG. 9. Also shown are a rear moisture sealing grommet 79', a connector shell 81', a retaining nut 83', a retaining ring 95', a coupling nut 85, a wave washer 87 and a snap ring 89.

What is claimed is:

1. A matable core pin and core bushing assembly, for molding of an electrical connector insert having an abutment portion, retention shoulders, and a contact sleeve for removably retaining contact retention clips, and electrical contacts restrained therein, within passages formed in the insert, comprising:

a plurality of core pins including a base section and a forward face, having at least two indented flat side portions extending from the base to the forward face, and at least two shoulder forms connecting the flat sides and the base section, and an axial projection extending from the forward face thereof; and a plurality of core bushings including a base, terminating as a forward face, and at least two side fins extending from the base, the forward face having a bore therein cooperable with the axial projection of the core pin, whereby upon mating of the core pin and core bushing, with the projection of the core pin mated, with the bore of the bushing and the side fins of the bushing flush with the flat side portions of the core pin, dielectric material is moldable thereabout to form said electric connector insert.

2. A matable core pin and core bushing assembly as defined in claim 1 wherein said flat side portions of the pins extend a distance no less than the length of a contact retention clip to be retained within the passage and the axial projection extending from the forward face of the pin forms a contact sleeve of a diameter no less than the diameter of the terminal element of a pin connector to be retained within the contact retention clip.

3. A matable core pin and core bushing assembly as defined in claim 1 wherein said core pin includes a forward facing shaft carrying the two indented flat sides and a reduced diameter portion forming stepped flat sides, the rearward section of the stepped flat sides having a length no less than the length of a contact retention clip to be retained within the passage and the forward portion of the stepped flat sides having a diameter and length no less than the terminal elements of a socket connector to be retained within the contact retention clip.

* * * * *